Dec. 9, 1930. M. C. IMLER 1,784,187
SHIPPING CRATE FOR SMALL ANIMALS
Filed Aug. 7, 1928 2 Sheets-Sheet 2
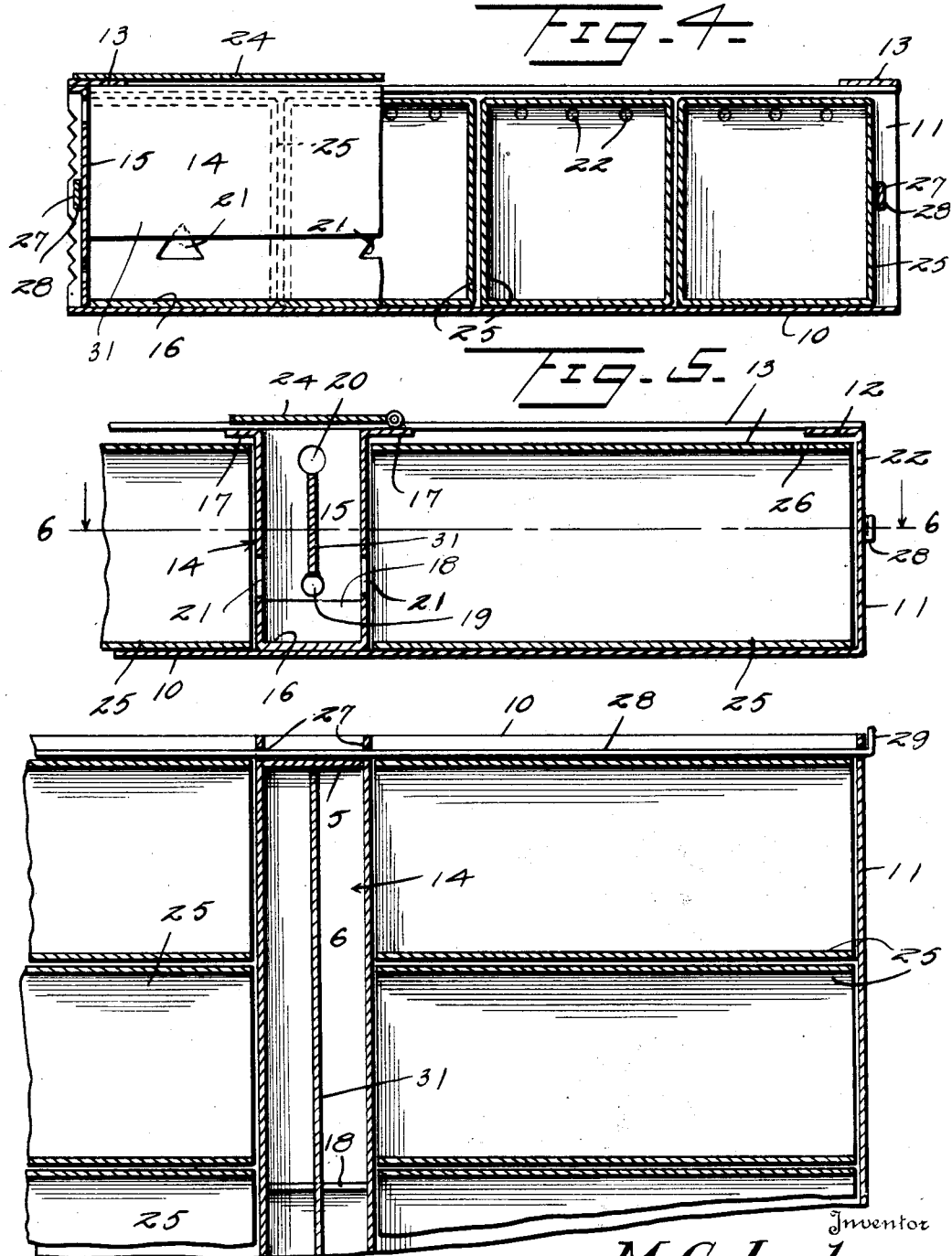

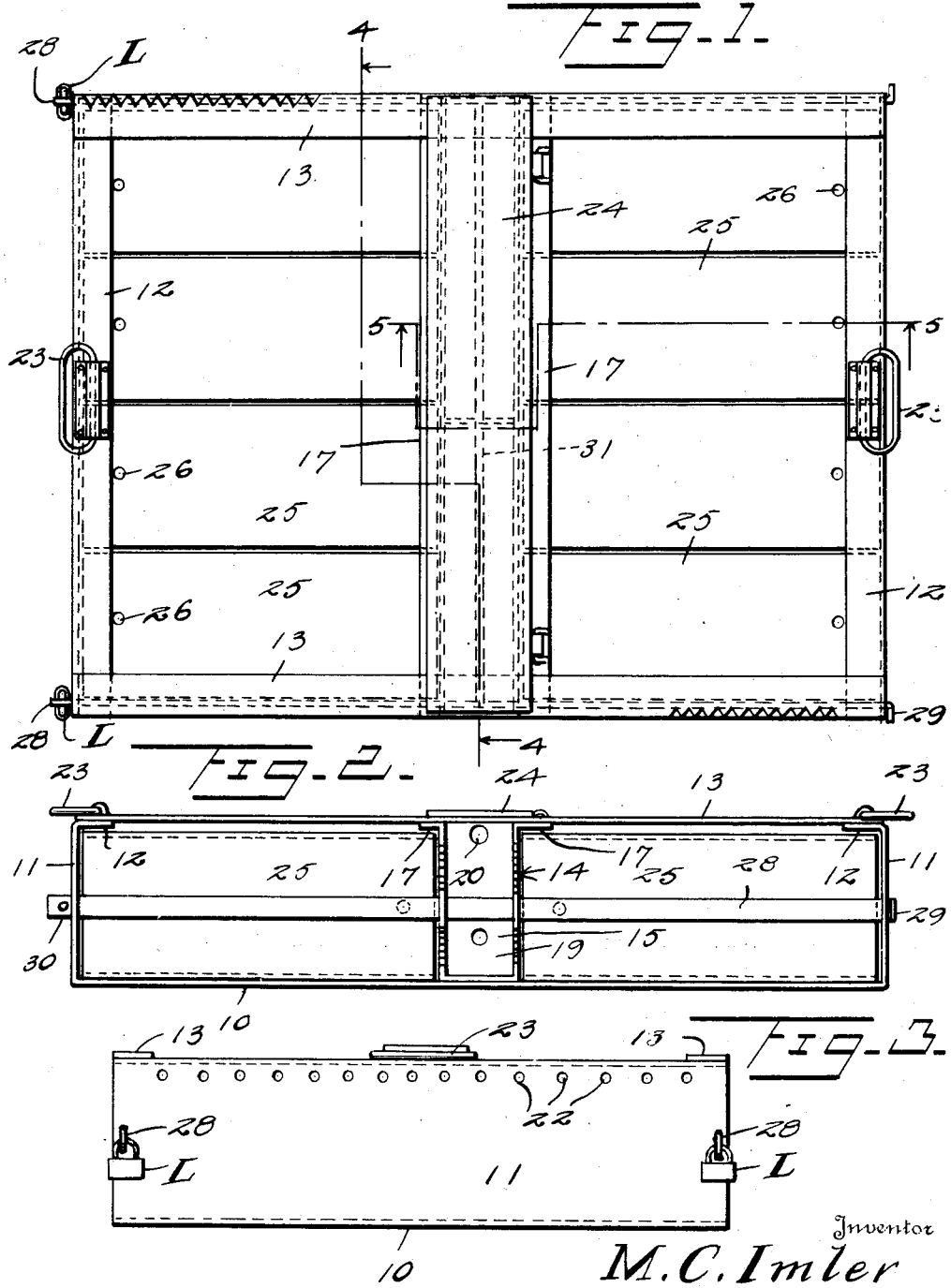

Patented Dec. 9, 1930

1,784,187

UNITED STATES PATENT OFFICE

MARVIN C. IMLER, OF MALHEUR COUNTY, OREGON

SHIPPING CRATE FOR SMALL ANIMALS

Application filed August 7, 1928. Serial No. 298,001.

This invention relates to shipping crates for small animals, such as muskrats and the like.

An important object of the invention is to provide a crate for simultaneously shipping a number of animals, in which each animal is conveniently provided with an individual cell and in which the individual cells are readily insertible and removable.

A further object of the invention is to provide in a construction of this character an arrangement insuring proper ventilation of the cells without regard to the manner in which the crates are stacked.

A still further object of the invention is to provide convenient means for introducing feed to the individual cells and to further provide a means for watering the animals of such construction that the water supplied to the animals is kept separate from the cells, so that it may not be contaminated by and, at the same time, will be readily accessible to the animals.

A still further object of the invention is to provide a construction permitting convenient securing of the cells in the crate structure.

A further object of the invention is the provision of a crate which is sanitary in its construction, which may be readily cleaned when disassembled and in which the animals are confined in individual removable cells, permitting their ready withdrawal from the crate and safe handling thereof.

These and other objects I attain by the construction shown in the accompanying drawings, wherein for the purpose of illustration is shown a preferred embodiment of my invention and wherein:—

Figure 1 is a plan view of a shipping crate constructed in accordance with my invention;

Figure 2 is a side elevation thereof;

Figure 3 is an end elevation thereof;

Figure 4 is a section on the line 4—4 of Figure 1;

Figure 5 is a section on the line 5—5 of Figure 1;

Figure 6 is a section on the line 6—6 of Figure 5.

Referring now more particularly to the drawings, the crate proper comprises a bottom 10 and ends 11 which may be conveniently formed from a single sheet of metal. The upper ends of the end walls are inbent, as indicated at 12, to provide horizontal ledges paralleling the bottom wall 10 and to these ledges at the ends thereof are secured the ends of brace bars 13. At the center of the crate, a U-shaped trough element 14 having closed ends 15 extends transversely of and has its bottom 16 secured to the bottom wall 10. The upper ends of the arms of the trough are out-turned, forming flanges opposing the bottom wall, as indicated at 17, and the longitudinal brace bars 13 are secured thereto. Centrally, the trough is provided with a partition 18, which prevents water placed in the trough from all running to one end thereof, trapping a certain portion of the water in each end of the trough without regard to inclination. Each end of the trough at the level of the upper edge of the partition has an overflow opening 19 and adjacent the upper end thereof has an air opening 20. The opening 19 also serves to admit air to the trough.

The arms of the trough are provided slightly above the level of the partition with openings 21, the purpose of which will presently appear.

Each end wall 11 has formed therein adjacent the upper end thereof a longitudinal series of openings 22. Upon each flange 12 of the end wall, a handle 23 is preferably secured and to one of the flanges 17 of the trough arms, a door 24 for covering the trough is hinged. The numeral 25 designates cells which are preferably in the form of open-ended tubes rectangular in cross section and each having in its upper wall adjacent the outer end thereof an opening 26 through which feed may be introduced to the tube. It will be obvious that if these open-ended tubes are inserted between an end wall and the adjacent arm of the trough, these walls will serve as closures for the ends thereof, preventing escape of the animals. Each animal in its cell has access to the trough through an opening 21 and this opening serves not only to provide access to the water but likewise to admit air to the cell from the trough. While I have above referred to the openings 26 as having been formed in the outer ends of the cell, it will, of course, be obvious that this is merely a preferred location. With some animals, it is necessary that the openings be disposed at the water trough end of the cell. This is particularly true where the animal is of such size that it may not turn about in the cell and accordingly must have feed and water at the same end of the cell in order that it may have access thereto.

As a means for securing the cells in position in the crate, the ends of the side walls and the arms of the U-shaped trough outwardly of the end walls 15 thereof are formed with aligned openings 27 through which may be passed bars 28.

Each bar 28 has at one end an angular flange 29 adapted to abut an end wall 11 and limit the extension of the bar through the opening thereof and at its opposite end, which projects beyond the outer face of the other end wall, an opening 30 through which a lock L may be inserted. To insure against cutting off of the air by close stacking of the boxes, the projecting ends of the trough outwardly of the side wall and the edges of the end walls and of the bars 13, may be made dentate, thus providing air spaces through which air may circulate between adjacent crates when maintaining the crates in spaced relation.

It will be obvious from the foregoing that a crate constructed in accordance with my invention is admirably adapted for shipping small animals and that the animals may be conveniently placed therein. Losses due to sickness incurred from contamination of drinking water or losses resulting from failure of a weaker animal to secure food in transit are absolutely prevented. At the same time, feeding and watering and handling of the animals are considerably facilitated. In this latter connection, it is pointed out that many animals are liable to bite when handled and accordingly persons endeavoring to remove the same from an ordinary crate, where they must be grasped and removed through an opening, are often bitten. With a construction of the character above described, the cell may be slid out far enough to enable the hind legs of the animal to be grasped and then the cell bodily removed and maintained about the body of the animal until it is transferred to the desired point. The cell thus serves as a means for preventing the animal from turning upon and biting the handler. In order to prevent fighting between animals in opposed cells above the trough, a transversely extending vertical partition 31 bisects the space above the water trough, this partition being secured at its ends to the end walls of the water trough.

Since the construction hereinbefore set forth is capable of a certain range of change and modification without materially departing from the spirit of the invention, I do not limit myself to such specific structure except as hereinafter claimed.

I claim:—

1. In a shipping crate for small animals, spaced parallel groups of individual open-ended cells, the cells of each group being parallel and contiguous, a containing structure for the cells having open sides and including parallel walls opposing the open ends of the cells of each group, means fixed with relation to the walls preventing vertical movement of the cells, and removable means supported by said walls and engaging the outer faces of the end cells of the group for preventing transverse movement of the cells.

2. In a shipping crate for small animals, spaced parallel groups of individual open-ended cells, the cells of each group being parallel and contiguous, a containing structure for the cells having open sides and including parallel walls opposing the open ends of the cells of each group, means fixed with relation to the walls preventing vertical movement of the cells, removable means supported by said walls and engaging the outer faces of the end cells of the group for preventing transverse movement of the cells, the walls between adjacent ends of the groups having connections therebetween forming a trough, and openings in said walls permitting access to the trough from the cells.

3. In a shipping crate for small animals, spaced parallel groups of individual open-ended cells, the cells of each group being parallel and contiguous, a containing structure for the cells having open sides and including parallel walls opposing the open ends of the cells of each group, means fixed with relation to the walls preventing vertical movement of the cells, removable means supported by said walls and engaging the outer faces of the end cells of the group for preventing transverse movement of the cells, the walls between adjacent ends of the groups having connections therebetween forming a trough, openings in said walls permitting access to the trough from the cells, and a hinged door for closing the space between the upper ends of said walls.

4. In a shipping crate for small animals, spaced parallel groups of individual open-ended cells, the cells of each group being parallel and contiguous, a containing structure for the cells having open sides and including parallel walls opposing the open ends of the cells of each group, means fixed with relation to the walls preventing vertical movement of the cells, removable means supported by said walls and engaging the outer faces of the end cells of the group for preventing transverse movement of the cells, the walls between adjacent ends of the groups having connections therebetween forming a trough, openings in said walls permitting access to the trough from the cells, there being a partition in the trough at the approximate center thereof, and openings in the end walls of the trough at the approximate level of the upper edge of said partition.

5. In a shipping crate for small animals, spaced parallel groups of individual open-ended cells, the cells of each group being parallel and contiguous, a containing structure for the cells having open sides and including parallel walls opposing the open ends of the cells of each group, means fixed with relation to the walls preventing vertical movement of the cells, and removable means supported by said walls and engaging the outer faces of the end cells of the group for preventing transverse movement of the cells, comprising bars directed through aligned openings in said walls and each having at one end a head to engage one of the walls to limit movement in one direction and at its opposite end being adapted for the reception of an element preventing casual displacement thereof.

6. In a shipping crate for small animals, spaced parallel groups of individual open-ended cells, the cells of each group being parallel and contiguous, a containing structure for the cells having open sides and including parallel walls opposing the open ends of the cells of each group, means fixed with relation to the walls preventing vertical movement of the cells, removable means supported by said walls and engaging the outer faces of the end cells of the group for preventing transverse movement of the cells, the walls between adjacent ends of the groups having connections therebetween forming a trough, openings in said walls permitting access to the trough from the cells, and a hinged door for closing the space between the upper ends of the last named walls, the end walls of the trough having openings therein permitting air thereto.

7. In a shipping crate for small animals, spaced parallel groups of individual open-ended cells, the cells of each group being parallel and contiguous, a containing structure for the cells having open sides and including parallel walls opposing the open ends of the cells of each group, means fixed with relation to the walls preventing vertical movement of the cells, and removable means supported by said walls and engaging the outer faces of the end cells of the group for preventing transverse movement of the cells, the means preventing vertical movement of the cells exposing the upper walls of the cells, the upper walls of the cells having openings therein for the introduction of food.

8. In a shipping crate for small animals, spaced parallel groups of individual open-ended cells, the cells of each group being parallel and contiguous, a containing structure for the cells having open sides and including parallel walls opposing the open ends of the cells of each group, means fixed with relation to the walls preventing vertical movement of the cells, and removable means supported by said walls and engaging the outer faces of the end cells of the group for preventing transverse movement of the cells, the means preventing vertical movement of the cells exposing the upper walls of the cells, said upper walls each having an opening formed therein for the introduction of food, the connections between the lower ends of the walls being in the form of a solid plate.

9. In a shipping crate for small animals, spaced parallel groups of individual open-ended cells, the cells of each group being parallel and contiguous, a containing structure for the cells having open sides and including parallel walls opposing the open ends of the cells of each group, means fixed with relation to the walls preventing vertical movement of the cells, and removable means supported by said walls and engaging the outer faces of the end cells of the group for preventing transverse movement of the cells, the means preventing vertical movement of the cells exposing the upper walls of the cells, said upper walls each having an opening formed therein for the introduction of food, said means at the lower ends of the walls being in the form of a solid plate a continuation of which forms the outer end walls for coaction with the cell groups.

10. In a shipping crate for animals, a structure including pairs of parallel inner and outer walls, the inner walls being connected at their ends and combining to form a water trough, and open-ended cells adapted to be arranged between said inner walls and the associated outer walls and having their ends closed thereby, the inner walls having openings permitting access to the water trough.

11. In a shipping crate for small animals, spaced parallel groups of individual open-ended cells, the cells of each group being parallel and contiguous, a containing structure for the cells having open sides and including parallel walls opposing the open ends of the cells of each group, means fixed with relation to the walls preventing vertical movement of the cells, removable means supported by said walls and engaging the outer faces of the end cells of the group for preventing transverse movement of the cells, the walls between adjacent ends of the groups having connections therebetween forming a trough, openings in said walls permitting access to the trough from the cells, a transversely extending partition in the trough subdividing the bottom of the trough into two sections, and a longitudinally extending vertical partition within the trough above the first named partition preventing access of animals at opposite sides of the trough to one another.

In testimony whereof I hereunto affix my signature.

MARVIN C. IMLER.